United States Patent
Intini et al.

(10) Patent No.: US 11,066,091 B2
(45) Date of Patent: Jul. 20, 2021

(54) OPERATING APPARATUS COMPRISING ROCKER ELEMENT FOR OPERATING AT LEAST ONE ELECTRICAL APPLIANCE, MOTOR VEHICLE COMPONENT COMPRISING AN OPERATING APPARATUS, MOTOR VEHICLE AND METHOD FOR OPERATING AN OPERATING APPARATUS

(71) Applicant: Valeo Schalter und Sensoren GmbH, Bietigheim-Bissingen (DE)

(72) Inventors: Onofrio Intini, Bietigheim-Bissingen (DE); Norbert Vajda, Veszprém (HU); Jozsef Gelencser, Veszprém (HU)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 90 days.

(21) Appl. No.: 16/466,801

(22) PCT Filed: Nov. 17, 2017

(86) PCT No.: PCT/EP2017/079640
§ 371 (c)(1),
(2) Date: Jun. 5, 2019

(87) PCT Pub. No.: WO2018/104033
PCT Pub. Date: Jun. 14, 2018

(65) Prior Publication Data
US 2020/0079416 A1      Mar. 12, 2020

(30) Foreign Application Priority Data

Dec. 5, 2016 (DE) ...................... 10 2016 123 411.7

(51) Int. Cl.
*B62D 1/04* (2006.01)
*H01H 23/00* (2006.01)
(Continued)

(52) U.S. Cl.
CPC ........... *B62D 1/046* (2013.01); *H01H 3/0213* (2013.01); *H01H 23/006* (2013.01); *H01H 23/025* (2013.01)

(58) Field of Classification Search
CPC .... B62D 1/046; H01H 3/0213; H01H 23/006; H01H 23/025; H01H 5/06; H01H 1/403; H01H 11/0018; H01H 13/023; G05G 1/02
See application file for complete search history.

(56) References Cited

U.S. PATENT DOCUMENTS 4,710,858 A * 12/1987 Van Hout ............ H01H 23/025
                                                              200/315
4,956,528 A *  9/1990 Janniere ............... H01H 13/023
                                                              200/248
(Continued)

FOREIGN PATENT DOCUMENTS

DE        4122429 A1 *  1/1993 ............... H01H 1/58
DE        9312587 U1    10/1993
(Continued)

OTHER PUBLICATIONS

EPO Machine Translation of DE 102005049848 (A1), Roland, Apr. 19, 2007 (Year: 2007).*
(Continued)

*Primary Examiner* — Vinh Luong
(74) *Attorney, Agent, or Firm* — Osha Bergman Watanabe & Burton LLP (57) ABSTRACT

An operating apparatus for operating at least one electrical appliance in a motor vehicle may include an operating element, a rocker that may actuate a switching element using a rocker movement initiated by an actuation of the operating element, at least one connector between the operating element and the rocker, the at least one connector being a vertical pin connector, and a circuit board which may
(Continued)

include a first side and a second side. The first side may include a switching element that switches when the operating element is actuated. The circuit board may be arranged between the operating element and the switching element so that the first side faces away from the operating element and the second side, lying opposite the first side, faces the operating element.

11 Claims, 6 Drawing Sheets

(51) Int. Cl.
*H01H 23/02* (2006.01)
*H01H 3/02* (2006.01)

(56) References Cited

U.S. PATENT DOCUMENTS

| | | | | |
|---|---|---|---|---|
| 5,584,381 | A * | 12/1996 | Brundage | H01H 23/025 200/313 |
| 2006/0021865 | A1* | 2/2006 | Gauzin | H01H 11/0018 200/339 |
| 2007/0007919 | A1* | 1/2007 | Blossfeld | H01H 23/006 318/280 |
| 2008/0142349 | A1* | 6/2008 | Lafontaine | H01H 13/72 200/5 B |
| 2010/0108485 | A1* | 5/2010 | Eckert | G05G 9/047 200/344 |
| 2016/0035504 | A1* | 2/2016 | Bleckmann | H01H 3/0213 200/4 |
| 2018/0122600 | A1* | 5/2018 | Jansen | H05B 47/10 |

FOREIGN PATENT DOCUMENTS

| | | |
|---|---|---|
| DE | 4400772 A1 | 7/1995 |
| DE | 19729342 A1 | 2/1999 |
| DE | 102005049848 A1 | 4/2007 |
| DE | 202008002960 U1 | 7/2009 |
| DE | 102012221107 B3 | 5/2014 |
| DE | 102013006414 A1 | 10/2014 |
| EP | 0773568 A2 * | 5/1997 |
| FR | 2975514 A1 | 11/2012 |
| WO | 0237516 A2 | 5/2002 |
| WO | 2010094984 A1 | 8/2010 |

OTHER PUBLICATIONS

EPO Machine Translation of DE 4400772 (A1), Siegfried, Jul. 20, 1995 (Year: 1995).*
International Search Report and Written Opinion issued in Corresponding PCT APplication No. PCT/EP2017/079640, dated May 17, 2018 (13 Pages with English Translation of International Search Report).
Search Report Issued in Corresponding German Application No. 102016123411.7, dated Sep. 28, 2017 (5 Pages).

* cited by examiner

OPERATING APPARATUS COMPRISING ROCKER ELEMENT FOR OPERATING AT LEAST ONE ELECTRICAL APPLIANCE, MOTOR VEHICLE COMPONENT COMPRISING AN OPERATING APPARATUS, MOTOR VEHICLE AND METHOD FOR OPERATING AN OPERATING APPARATUS

FIELD OF THE INVENTION

The invention relates to an operating apparatus for operating at least one electrical appliance in a motor vehicle. The operating apparatus comprises an operating element and a circuit board with a first side, on which a switching element is arranged. The switching element is switchable when the operating element is actuated. Further, the invention relates to a motor vehicle component comprising an operating apparatus. Further, the invention relates to a motor vehicle comprising a motor vehicle component, and a method for operating an operating apparatus.

BACKGROUND

In the present case, the interest is directed to, in particular, operating apparatuses for motor vehicles. Various embodiments of such operating apparatuses are known from the prior art. Such operating apparatuses usually comprise an operating element that is actuatable for the purposes of carrying out an operating action. Here, the actuation can be implemented, for example, using at least one finger or an appropriate input appliance. The operating input can be detected by a corresponding detection device. It is possible to output an appropriate control signal as a consequence of the detected operating action, a functional device of the motor vehicle, in particular of an electrical appliance of the motor vehicle, being able to be actuated by means of said control signal. By way of example, such a functional device can be an information and entertainment system, a navigation system, an air-conditioning unit or the like.

Motor vehicle construction, in particular, has disclosed operating elements in this case, which are installed on a manual steering implement or a central console, for example. In particular, a separate pushbutton, rocker or roller is installed in this case for each electrical appliance or for each function of an electrical appliance. As a result of this, it is necessary to make more separate pushbuttons, rockers or rollers available, particularly in the case of ever more complex motor vehicles with more electrical appliances or functions. This can become confusing and may lead to unwanted operations, particularly also in the case of safety-relevant functions.

SUMMARY

It is an object of the present invention to create an operating apparatus, a motor vehicle component, a motor vehicle and a method for operating an operating apparatus so as to facilitate an operation that is as convenient and reliable as possible.

According to the invention, this object is achieved by an operating apparatus, a motor vehicle component comprising an operating apparatus, a motor vehicle and by a method for operating an operating apparatus having the features according to the respective independent claims.

An operating apparatus according to the invention for operating at least one electrical appliance in a motor vehicle comprises at least one operating element and a circuit board with a first side. A switching element is arranged on the first side of the circuit board, wherein the switching element is switchable when the operating element is actuated.

An essential concept of the invention is that the circuit board is arranged between the operating element and the switching element. The first side of the circuit board faces away from the operating element and a second side, lying opposite the first side, faces the operating element. The operating apparatus has a separate rocker element which, depending on actuation of the operating element, is embodied to actuate the switching element by a rocker movement initiated by said actuation of the operating element. The advantage of this is that, if a force is exerted on the operating element, this force can be transferred particularly reliably and conveniently onto the switching element by way of the rocker element such that the switching element switches in particularly reliable fashion. This allows further components to be installed on the second side of the circuit board, said further components then being able to interact in highly functional fashion and with adjacent further elements; this is facilitated with great minimization of the installation space. This can create a particularly reliable and convenient operating apparatus which has a particularly compact design.

The operating apparatus can be used in a motor vehicle. The operating apparatus can be arranged in an interior of the motor vehicle, for example in the centre console or on the instrument cluster, in particular on a manual steering implement. The operating apparatus comprises the operating element which, for example, can be operated by the driver of the motor vehicle or a further occupant in the motor vehicle. For the purposes of carrying out the operating action, during which the operating element is operated, the vehicle occupant can press the operating element for example with at least one finger or an appropriate input appliance or said vehicle occupant can touch said operating element. This contact or the operating action can be detected with the aid of the detection device of the operating apparatus. An appropriate control signal can then be output depending on the operating action detected by the detection device and the at least one electrical appliance or a function of the electrical appliance or a plurality of electrical appliances can be actuated accordingly.

In particular, a force exerted on the operating element by the operator, for example by pressing, can be transferred onto the switching element. In particular, the switching element is embodied in such a way that it only switches at a predetermined force threshold, switching meaning, in particular, that an electric circuit is closed such that the at least one electrical appliance can be operated. In particular, the force threshold serves to provide the operator with haptic feedback that an operation of the at least one electrical appliance has taken place.

In particular, provision is made for the force exerted by the operator on the operating element to be transferred onto the separate rocker element. This initiates a rocker movement of the rocker element, with provision being able to be made, in particular, for the rocker element to be coupled to the switching element. Consequently, force is transferred to the switching element by way of the rocker movement of the rocker element. The haptic feedback of the switching element is likewise transferable to the operator by way of the rocker element such that the operator can be provided with haptic feedback after switching the switching element. Consequently, this configuration creates installation space on the second side of the circuit board. Further elements can be arranged in this installation space, said further elements, for example, being able to serve for a further control of the operating apparatus or an improvement thereof. This facilitates a convenient operation of the operating apparatus.

In one advantageous configuration, the operating element can comprise at least one connecting element, in particular two connecting elements, in particular four connecting elements, by means of which an actuation of the operating element is transferable onto the rocker element. Consequently, the force exerted on the operating element by the operator can be transferred, in an advantageous manner, onto the rocker element in a reliable and tolerance-free fashion by way of the at least one connecting element. Particularly in the configuration with two connecting elements or with four connecting elements, it is possible to carry out an improved and mechanically reliable and precise force distribution onto the rocker element such that the operating apparatus is actuatable in particularly reliable and convenient fashion; in particular, the rocker element can be set into the rocker movement such that the switching element switches.

According to a further advantageous configuration, the connecting element can have a pin-type embodiment. The connecting element or the connecting elements for the operating apparatus can be provided in a simple and particularly material-saving manner by means of the pin-type connecting element since the latter can also have a relatively thin embodiment. In particular, the force exerted on the operating element can be transferred onto the rocker element in a particularly simple manner and without force losses by means of the rigid, pin-type connecting elements.

It was found to be furthermore advantageous if the connecting element extends on both sides of the circuit board, in particular through a feedthrough in the circuit board. The rocker element can be coupled to the connecting element on two sides by means of this configuration. This leads to an improved force distribution and hence to a more reliable and convenient operation of the operating apparatus or to a reliable initiation of the rocker movement of the rocker element. By means of the feedthrough, in particular, it is possible to create a guide for the connecting element such that the operation of the operating apparatus can be carried out even more reliably. Moreover, the feedthroughs can create an even more compact design of the operating arrangement such that installation space can be saved.

According to a further advantageous configuration, the operating apparatus can comprise at least one capacitive sensor for detecting a point of contact by a user, in particular a finger of a user, on an operating surface of the operating element. As a result, it is possible to detect the contact or the operating action. The capacitive sensor likewise renders it possible to detect the position at which the operating element is contacted. Consequently, carrying out unwanted contact by another body part or by an object, for example, and hence an unwanted operation of the at least one electrical appliance can be prevented. By way of example, this means that the operating apparatus operates the at least one electrical appliance only when a finger is detected and when the operating element is operated, i.e., pressed. Consequently, an unwanted operation of the electrical appliance can be prevented.

It was found to be furthermore advantageous if an operating surface of the operating element has a seamless embodiment. In particular, this means that the operating surface does not have gaps in which dirt or other particles, for example, can accumulate. This is advantageous in that the service life of the operating apparatus overall is increased since no dirt can penetrate into the operating apparatus. Moreover, the convenience of the operating apparatus for the operator can be increased by means of the seamless operating surface.

In particular, provision can be made for the operating surface to be seamless and have elevations or depressions. In particular, the elevations or depressions have an ergonomic embodiment. In particular, the elevations or depressions can serve to provide haptic feedback to the operator in respect of what electrical appliance or function of the electrical appliance can be operated at the point of contact. In particular, provision can be made for an elevation or depression on the seamless operating surface to be assigned to each function or each electrical appliance.

It is furthermore advantageous if the operating element comprises at least one pictogram. In particular, the pictogram describes a function of the operable electrical appliance, wherein the pictogram in particular has an at least partly transparent embodiment. In particular, provision can be made for a lighting element to be arranged on the second side of the circuit board such that the at least partly transparent pictogram is illuminable. Installation space for at least one lighting element, in particular, is present on the second side of the circuit board by virtue of the switching element being arranged on the first side of the circuit board. In particular, the lighting element can be an LED (light-emitting diode). In particular, this can easily indicate to the operator of the operating element what electrical appliance or what function of the electrical appliance the operator is operating when actuating the operating element. In particular, provision can be made for the pictogram to be formed on the operating surface such that the pictogram can be optically indicated to the operator at all times, even when the operating apparatus is not being operated. As a result of the concept with the installation of the circuit board between the operating element and the switching element, it is also possible to install further components on the circuit board in side-specific fashion in order then to be able to interact in highly functional fashion and with adjacent further elements; this is facilitated with great minimization of the installation space.

It is furthermore advantageous if a plurality of electrical appliances are operable by means of the operating apparatus. The operating element can display the plurality of electrical appliances as pictograms that are spatially separated from one another. The operating apparatus can have a control device that operates the respective electrical appliance on the basis of a signal of a capacitive sensor. In particular, the capacitive sensor is able to produce the signal by the different spatial actuation of one of the pictograms by the user, in particular the finger of the user. Furthermore, provision can be made for, in particular, the plurality of pictograms to have an at least partly transparent embodiment and for a respective lighting element to be arranged for a respective pictogram on the second side of the circuit board. Consequently, the respective at least partly transparent pictogram is illuminable and the respective lighting element can differ in terms of its colour and/or in terms of its illumination type. This means that an operating apparatus with one operating element and one switching element is sufficient for a plurality of functions to be operated of an electrical appliance or for a plurality of electrical appliances to be operated.

Localization of the location of actuation by the operator can be detected by means of the capacitive sensor. A function can be assigned to the detected location in respect of which functions of the electrical appliance or which electrical appliance are/is intended to be operated by the operator. After identifying the finger of the operator, in particular, and after actuating the operating element, it is consequently possible for the function of the electrical appliance or of the desired electrical appliance to be operated.

For an improved optical representation, the respective pictogram can then be illuminated by means of a different colour, for example, such that safety-relevant functions (e.g., hazard warning device), in particular, can be represented in red, for example, and non-safety-relevant functions can be represented in green, for example. It is likewise possible for the state of the different functions to be represented by means of the different colours. By way of example, a green colour may provide information that a function is currently in use while a red colour may represent an outage or a defect of function a), for example. It is likewise possible for a function or a state of the electrical appliance to be indicated by means of different types of lighting; by way of example, this means, in particular, different flashing (e.g., frequency difference or luminous intensity). This is possible since the arrangement of the switching element on the first side of the circuit board has created installation space on the second side of the circuit board such that a control device or at least one lighting element can be arranged accordingly on the second side of the circuit board. This configuration is advantageous in that a plurality of electrical appliances or a plurality of functions of the electrical appliances can be operated by means of one operating apparatus. Consequently, an operating apparatus can be provided in a motor vehicle in a simple, component-saving and convenient manner.

In one embodiment, the switching element can be embodied as a microswitch or a switching mat or a snap-action panel for producing haptic feedback.

In principle, provision can also be made for the rocker element to have at least one first rocker part and one second rocker part connected thereto in hinged fashion. A first connecting element of the operating element contacts the first rocker part, in particular, and a second connecting element of the operating apparatus contacts the second rocker part. By means of this configuration, it is possible to provide a simple yet reliable rocker element. In particular, it is consequently possible to transfer a force acting on the operating element of the operating apparatus onto the rocker element via the first connecting element and the second connecting element. Consequently, a redundant system can be provided such that, in the case, for example, of an outage of one of the connecting elements, an operation of the electrical appliance can continue to be realized by the second connecting element.

For the purposes of switching the switching element, the rocker element can be couplable to the switching element by means of a rocker joint according to a further advantageous configuration, at which rocker joint the first rocker part is connected to the second rocker part in hinged fashion. The force transfer of the operating element onto the rocker element is very advantageous, particularly on the rocker joint. Therefore, what preferably became apparent is that the switching element is couplable to the rocker joint. As a result, the switching element can be actuated with a short actuation travel and/or with little force outlay.

In this configuration there is, in particular, a bending movement of the rocker element. By means of the force exertion of the connecting elements on the first rocker part, the latter is pressed in a first direction at the point of connection to the connecting element. At the rocker joint, the first rocker part or the second rocker part is pressed in the second direction opposite to the first direction since leverage is exerted on the first rocker part by the connecting element on a first side of the rocker part and consequently the second side of the rocker part is pressed in the opposite direction. Thus, overall, there is a bending movement or folding movement or folding together movement of the rocker element. For the purposes of actuating the rocker element, the connecting elements simultaneously act in the same direction such that there is folding together about the rocker joint by an actuation of the two rocker parts. In particular, the switching element is coupled to the rocker element of the rocker joint such that, in particular, the force transfer is greatest at the rocker joint, as a result of which particularly convenient switching of the operating apparatus can be carried out.

In particular, provision can be made for the rocker joint to be embodied as a hinge. In this case, provision can be made for the two rocker parts to be connected by a metal pin at the rocker joint. In particular, each rocker part may have teeth or fingers, for example, which correspond to cutouts in the other rocker part. Thus, the two rocker parts can be slotted together such that a metal pin is inserted along the axis of rotation of the rocker element. It is likewise possible for the two hinge parts to be slotted together. To this end, the rocker parts can have corresponding grooves and tongues such that they are rotatable about the axis of rotation of the rocker element. It is likewise possible for the rocker element to be a living hinge.

In a further advantageous configuration, the rocker element can be embodied as an integral plate. The rocker element is coupled to a connecting element at a first end of the rocker element and coupled to a switching element at a second end of the rocker element. When actuating the operating element, a force can be transferable to the first end of the rocker element and the rocker element can be pivotable about a rocker bearing lying between the ends. The leverage that has arisen thus can be transferable to the switching element at the second end of the rocker element. This configuration allows the rocker element to be made available in a particularly component- and material-saving manner.

A further independent aspect of the invention relates to an operating apparatus for operating at least one electrical appliance in a motor vehicle. The operating apparatus may comprise an operating element and a circuit board, with the circuit board having a first side on which a switching element is arranged. The switching element is switchable if the operating element is actuated. Provision is made for the operating apparatus to have a rocker element, by means of which an actuation of the operating element is transferable to the switching element, with the rocker element having at least one first rocker part and a second rocker part connected therewith in hinged fashion. A first connecting element of the operating apparatus is in contact with the first rocker part and a second connecting element of the operating element is in contact with the second rocker part. Consequently, the rocker parts can be moved together by a folding movement about a rocker joint for the purposes of contacting and switching the switching element when the operating element is operated.

A yet further independent aspect of the invention relates to an operating apparatus for operating at least one electrical appliance in a motor vehicle, comprising an operating element and comprising a circuit board with a first side. A switching element is arranged on the first side of the circuit board, with the switching element switching when the operating element is actuated. Provision is made for the operating apparatus to have a rocker element which is embodied as an integral and, in particular, inherently rigid plate. The rocker element is coupled to a connecting element of the operating element at a first end of the rocker element and to the switching element at a second end of the rocker element. By actuating the operating element, it is possible to transfer a force onto the first end of the rocker element and pivot the rocker element about a rocker bearing (leverage). Consequently, the switching element is contacted and switchable by way of the second end of the rocker element.

The invention also relates to a motor vehicle component comprising an operating apparatus as described above. The motor vehicle component can be, in particular, a manual steering implement such as a steering wheel or a centre console of a motor vehicle.

Furthermore, the invention relates to a motor vehicle comprising a motor vehicle component. Here, the motor vehicle can be embodied as a passenger car, in particular.

The invention furthermore relates to a method for operating an operating apparatus for at least one electrical appliance in a motor vehicle. A switching element on a first side of the circuit board of the operating apparatus is actuated when actuating an operating element of the operating apparatus. According to the invention, provision is made for the circuit board to be arranged between the operating element and the switching element such that the first side of the circuit board faces away from the operating element and a second side, lying opposite the first side, faces the operating element. A rocker element of the operating apparatus is actuated when actuating the operating element and the switching element is contacted and switched by a rocker movement of the rocker element triggered thereby.

Embodiments of the aspect of the invention should be considered to be advantageous embodiments of the further aspects of the invention.

The preferred embodiments that were presented with respect to the operating apparatus according to the invention and the advantages thereof apply accordingly to the motor vehicle component according to the invention, to the motor vehicle according to the invention and to the method according to the invention.

Further features of the invention arise from the claims, the figures and the description of the figures. The features and combinations of features specified in the description above and the features and feature combinations specified in the description of the figures below and/or only shown in the figures are usable not only in the respectively specified combination, but also in other combinations or on their own, without departing from the scope of the invention. Consequently, embodiments that are not explicitly shown in the figures and explained but arise and are producible from separated feature combinations of the explained embodiments should also be considered as comprised by and disclosed in the invention. Embodiments and feature combinations which consequently do not have all features of an originally phrased independent claim should also be considered to be disclosed.

BRIEF DESCRIPTION OF THE DRAWINGS

The invention will now be explained in more detail on the basis of preferred exemplary embodiments and with reference to the attached drawings.

In detail.

The same and functionally equivalent elements are denoted by the same reference signs in the figures.

DETAILED DESCRIPTION

Figure 1:
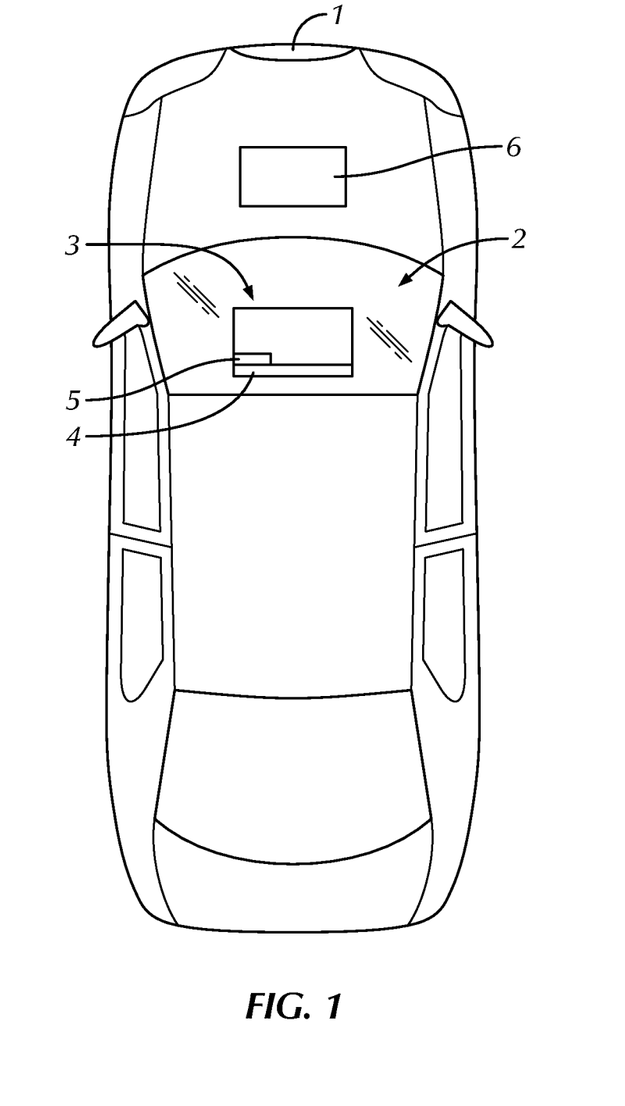
FIG. 1 shows a motor vehicle according to an embodiment of the present invention, comprising an operating apparatus.

FIG. 1 shows a plan view of a motor vehicle 1 according to an embodiment of the present invention. In the present case, the motor vehicle 1 is embodied as a passenger car. The motor vehicle 1 comprises an interior 2, in which an operating apparatus 3 is arranged. The operating apparatus 3, illustrated schematically in the present case, comprises at least one operating element 4, which can be operated by an occupant of the motor vehicle 1. The operating apparatus 3 can be arranged in the interior 2 of the motor vehicle 1 in such a way that the operating element 4 faces the occupant of the motor vehicle 1.

An operating action in the form of the actuation of the operating element 4 can be detected using the operating apparatus 3. To this end, the operating apparatus 3 may furthermore comprise a detection device 5, for example, the latter being able to be embodied, in particular, as a touch-sensitive sensor, in particular as a capacitive sensor. By way of example, this detection device 5 can be used to detect contact of at least one finger or an appropriate input appliance on the operating surface 7. Moreover, the detection device 5 can identify the position of the contact on the operating element 4. If the operating action or the contact of the operating element 4 is identified by the detection device 5, a corresponding control signal can be output.

In particular, provision can be made for at least one electrical appliance 6 to be able to be operated by means of the operating apparatus 3. Here, provision can be made for it to be possible to operate a plurality of functions of the electrical appliance 6 by means of the operating apparatus 3 or operate a plurality of electrical appliances 6 by means of the operating apparatus 3.

Figure 2A:
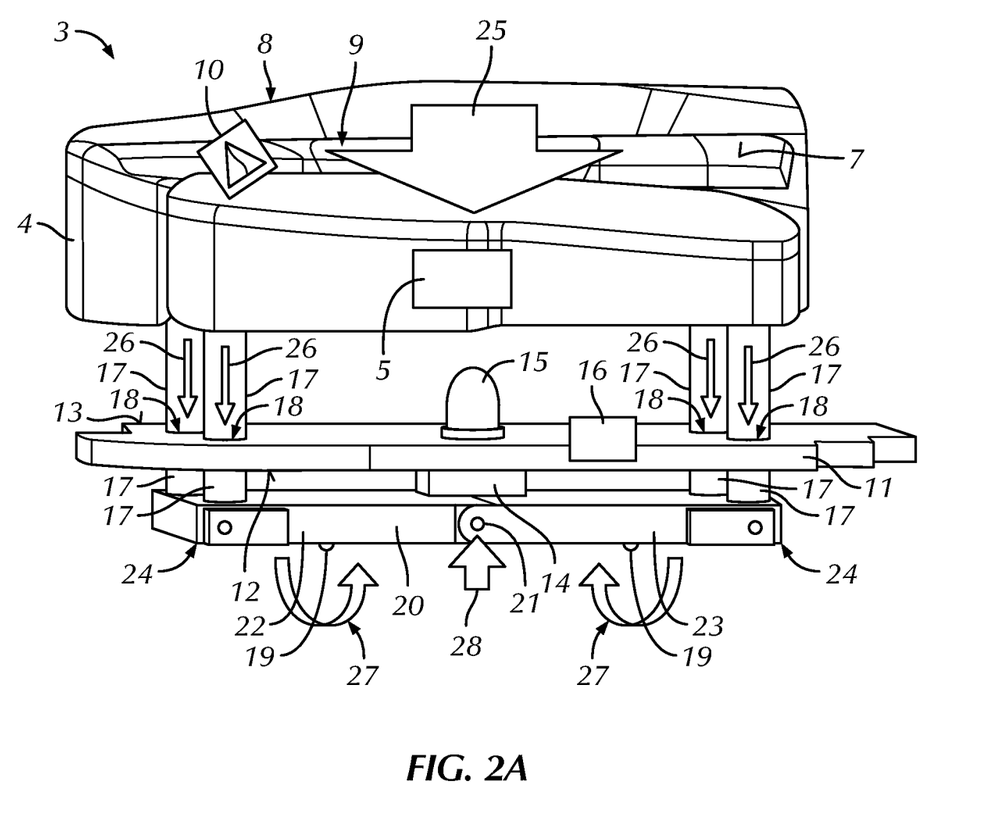
FIG. 2a shows a schematic perspective view of an embodiment of the operating apparatus.

FIG. 2a shows a schematic perspective view of an embodiment of an operating apparatus 3 according to the invention. The operating apparatus 3 comprises the operating element 4 and the detection device 5 which, in particular, may be embodied as a capacitive sensor. Here, the operating element 4 may have an operating surface 7, in particular. Elevations 8 or depressions 9 may in particular be situated on the operating surface 7; these are embodied to provide an operator, not shown, of the operating element 4 with haptic feedback, in particular in relation to which electrical appliance 6 is operated by the operator. Here, provision can be made, in particular, for the elevations 8 or depressions 9 to be adapted in ergonomic fashion. In particular, the operating surface 7 of the operating element 4 can have a seamless embodiment.

Furthermore, provision can be made for at least one pictogram 10 or, in particular, a plurality of pictograms 10 to be formed on the operating surface 7. In particular, the pictograms 10 serve to describe a function of the operable electrical appliance 6 or a plurality of functions of a plurality of operable electrical appliances 6. In particular, the pictograms 10 can have an at least partly transparent embodiment.

Furthermore, the operating apparatus 3 comprises a circuit board 11. In particular, the circuit board 11 comprises a first side 12 and a second side 13. A switching element 14 is arranged on the first side 12. In particular, the switching element 14 is embodied as a microswitch or a switching mat or a snap-action panel and can produce haptic feedback for the operator.

In particular, a lighting element 15 can be arranged on the second side 13 of the circuit board 11. In particular, the lighting element 15 is embodied in such a way that it can illuminate the pictogram 10 or the plurality of pictograms 10. In particular, provision can be made for a plurality of lighting elements 15 to be arranged on the second side 13 of the circuit board 11 such that a respective lighting element 15 is assigned to each pictogram in the case of a plurality of pictograms 10. In particular, the lighting element 15 can be actuated in such a way that it can shine with a different colour or different types of lighting. Using this, the plurality of pictograms 10 can be illuminated differently. By way of example, the lighting element 15 can be embodied as an LED (light-emitting diode). The type of lighting can be understood to mean, for example, that the lighting element 15 flashes at different speeds or differs in terms of its luminous intensity.

By way of example, the pictogram 10 can be illuminated by a red colour in the case of safety-relevant functions. It is likewise possible for the state of a function, for example whether the electrical appliance is activated or deactivated or defective, to likewise be able to be represented by a colour of the lighting element 15.

The circuit board 11 furthermore comprises a control device 16. In particular, the control device 16 is embodied to detect a signal of the detection device 5 and to actuate the electrical appliance 6 accordingly.

In particular, the operating apparatus 3 comprises a connecting element 17, in particular four separate connecting elements 17. In particular, the connecting elements 17 have a pin-type embodiment. In particular, the connecting elements 17 furthermore extend on both sides of the circuit board 11. In particular, the connecting elements 17 are coupled to the operating element 4 and, in particular, extend through respectively one feedthrough 18 of the circuit board 11.

A separate rocker element 20 faces the first side 12 of the circuit board 11. The rocker element 20 has a first rocker part 22 and a second rocker part 23. The rocker parts 22 and 23 are coupled by way of a rocker joint 21. The first rocker part 22 and the second rocker part 23 have an axis of rotation 19. The rocker parts 22, 23 are rotatable about the respective axis of rotation 19. The respective rocker parts 22, 23 are couplable to the connecting elements 17 at a respective first end 24, facing away from the rocker joint 21, of the rocker parts 22, 23. The rocker element 20 is couplable in turn to the switching element 14 at the rocker joint 21.

For the purposes of operating the at least one electrical appliance 6, the operator presses the operating element 4, in particular the operating surface 7 of the operating apparatus 3. The detection device 5, in particular, detects contact and, in particular, the point of contact of the finger. Depending on the localization of the finger on the basis of the detected signal of the detection device 5, the control device 16 determines the operating location. A force exerted on the operating apparatus 3, which is represented by the force arrow 25, is transferred onto the connecting elements 17. A transferred force, which is represented by the force arrows 26 in turn, is transferred through the circuit board 11 onto the first ends 24 of the rocker element 20. The connecting elements 17 simultaneously act on the top sides of the rocker parts 22, 23 facing the circuit board 11. About the respective axis of rotation 19, the respective rocker part 22, 23 is made to rotate 27 about the axis of rotation 19 by the exerted force (leverage).

The rocker element 20 carries out a folding movement, in particular at the rocker joint 21. A rocker movement 28 (arrow representation) or folding movement of the rocker element 20 initiated thereby leads to force being exerted on the switching element 14, as a result of which the switching element 14 is switched since the rocker joint 21 moves toward the switching element 14. The control device 16 detects the switching signal of the switching element 14. Together with the signal of the detection device 5 and the switching signal of the switching element 14, the control device 16 can accordingly control the electrical appliance 6 or the function of the electrical appliance 6.

Figure 2B:
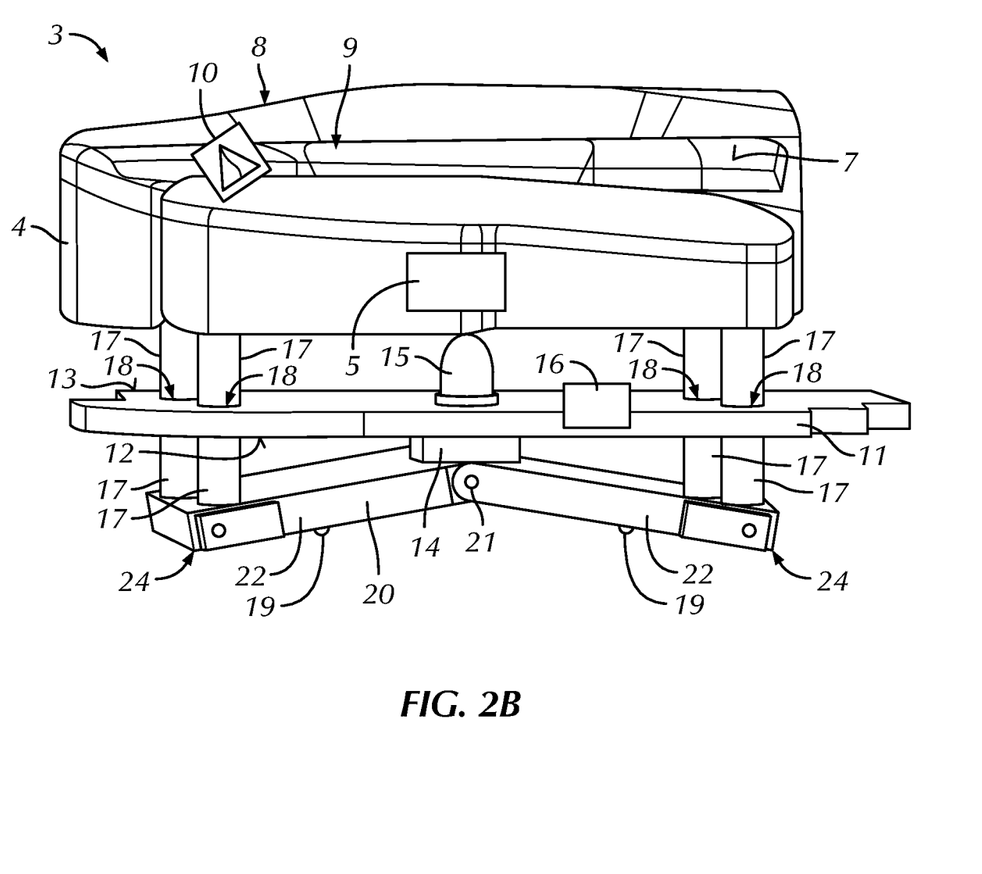
FIG. 2b shows a schematic perspective view of the operating apparatus following actuation.

FIG. 2b shows a schematic perspective view of the rocker element 20 demonstrated in FIG. 2a following an actuation of the operating element 4. In this embodiment, the connecting elements 17 have transferred a force to the rocker element 20. The rocker element 20 thereby exerts a force on the switching element 14, as a result of which the switching element 14 is switched.

Figure 3:
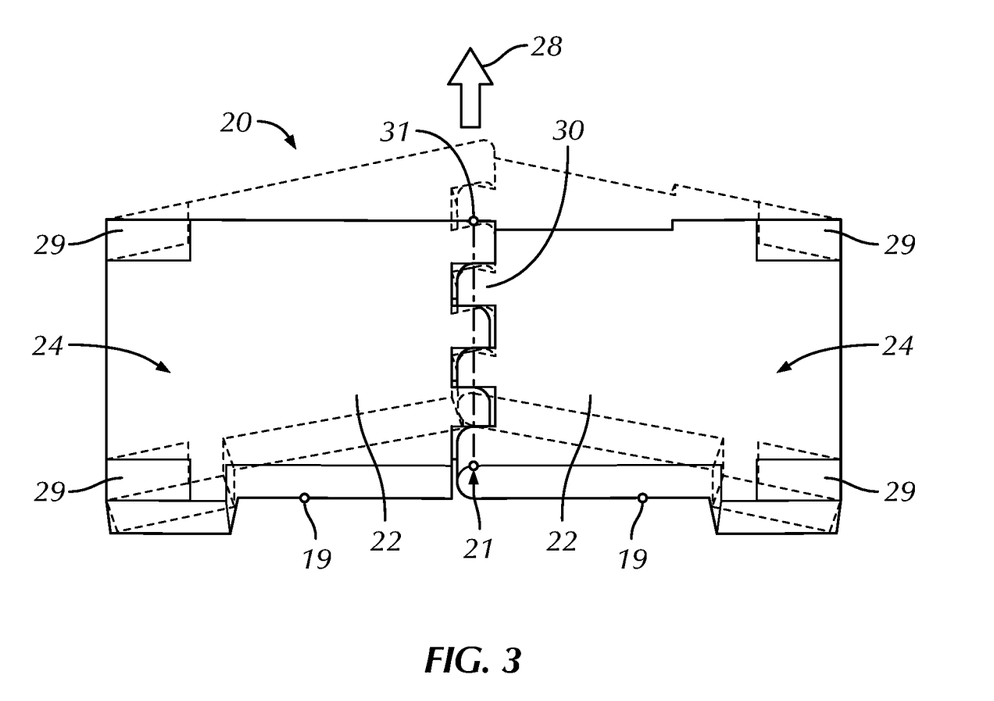
FIG. 3 shows a schematic perspective view of an embodiment of a rocker element of the operating apparatus.

FIG. 3 shows a schematic perspective view of an exemplary embodiment of the rocker element 20 of the operating apparatus 3. Here, in particular, the first rocker part 22 is coupled to the second rocker part 23 by way of the rocker joint 21. Coupling points 29, which are provided to be coupled with the connecting elements 17, can be formed at the first ends 24 of the rocker element 20, in particular. The coupling points 29 can be depressions. Consequently, a lever arm that is as large as possible can be provided for the subsequent rocker movement 28. In particular, a further coupling point 30 can be provided at the rocker joint 21, said further coupling point serving to couple the rocker joint 21 to the switching element 14. That is to say, the switching element is switchably coupled at this point 30 in the case of a rocker movement 28 of the rocker element 20. Here, the rocker joint 21 can be configured in such a way that the rocker parts 22, 23 engage in one another by way of corresponding teeth or fingers and recesses. The first rocker part 22 and the second rocker part 23 can be rotatably connected to one another by way of a pin 31 such that the rocker movement 28 can be carried out at the rocker joint 21. It is likewise possible for the rocker parts 22, 23 to be slotted together using a tongue and groove system and be tiltably mounted by way of a lug-trough system. It is likewise possible for the rocker joint 21 to be embodied as a living hinge and a taper to be formed at the point at which the first rocker part 22 is connected in hinged fashion to the second rocker part 23 such that the rocker movement 28 can be carried out. Then, the rocker element 20 has an integral embodiment in this embodiment.

Figure 4:
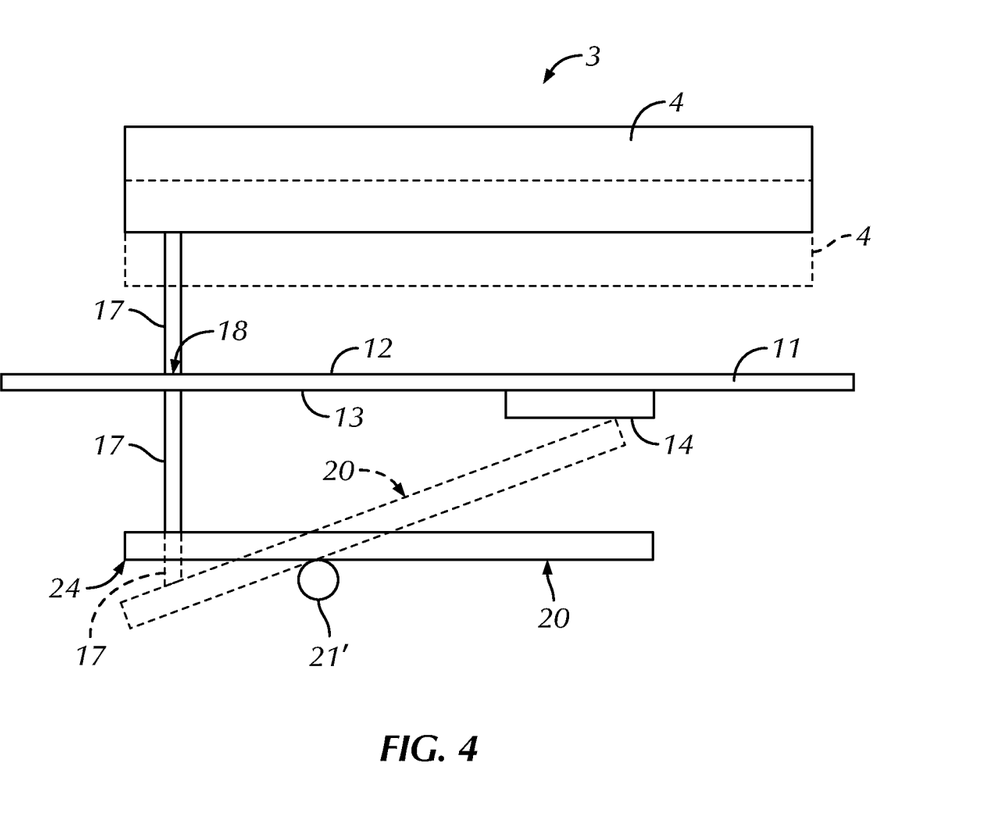
FIG. 4 shows a schematic side view of a further exemplary embodiment of an operating apparatus.

It is likewise possible, as schematically shown in FIG. 4, for the rocker element 20 to be embodied as an integral and inherently rigid plate, wherein the rocker element 20 is coupled to the connecting element 17 at the first end 24 of the rocker element 20. The rocker element 20 can be coupled to the switching element 14 at a second end of the rocker element 20 such that the force is transferable onto the first end 24 of the rocker element 20 when the operating element 4 is actuated and the rocker element 20 is pivotable about a rocker bearing 21' lying between the ends. The leverage arising thus can then be transferred onto the switching element 14 at the second end of the rocker element 20 such that the switching element 14 switches.

Figure 5:
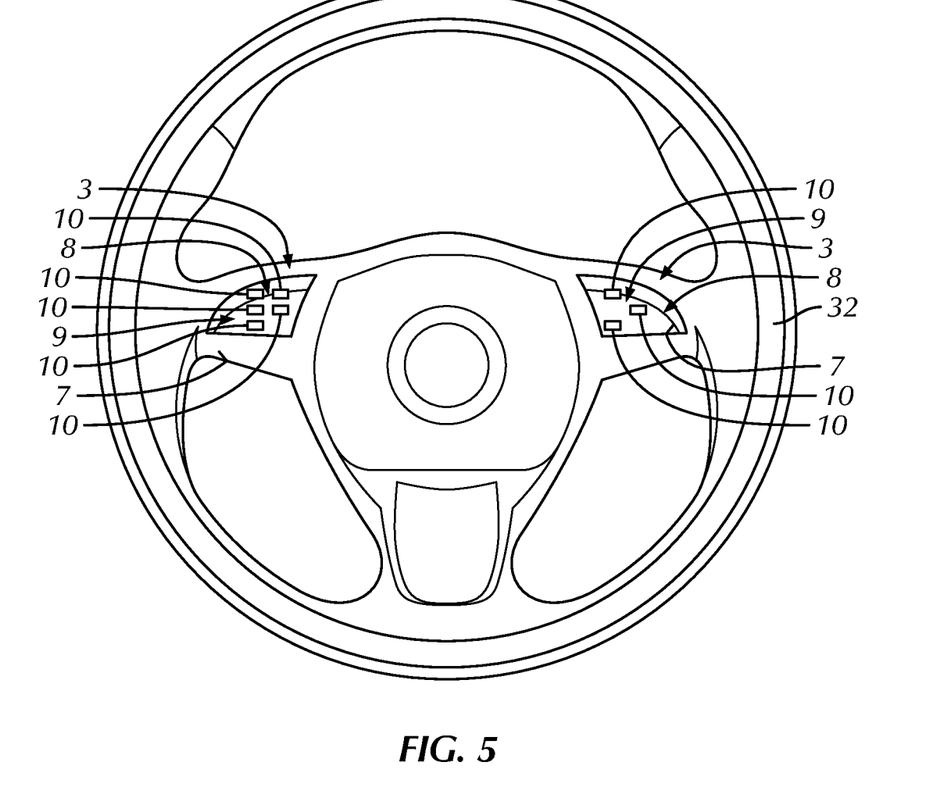
FIG. 5 shows a schematic perspective view of an embodiment of a motor vehicle component with an operating apparatus according to the invention.

FIG. 5 shows a schematic perspective view of an exemplary embodiment of a motor vehicle component 32 according to the invention. In this exemplary embodiment, the motor vehicle component 32 is embodied as a steering wheel. It is likewise possible for the motor vehicle component 32 to be embodied as a centre console, for example. The motor vehicle component 32 has two operating apparatuses 3 in this example. The two operating apparatuses 3 each have a seamless operating surface 7. Arranged on the respective operating surface 7 are a multiplicity of pictograms 10, which are able to describe different functions of an electrical appliance 6 or different electrical appliances 6. Furthermore, the operating apparatus 3 has various elevations 8 and depressions 9.

The invention claimed is:

1. An operating apparatus for operating at least one electrical appliance in a motor vehicle, the operating apparatus comprising:
    an operating element;
    a circuit board comprising a first side and a second side, the first side comprising a switching element,
        wherein the switching element is switched when the operating element is actuated, and
        wherein the circuit board is arranged between the operating element and the switching element such that the first side faces away from the operating element and the second side, lying opposite the first side, faces the operating element;
    a rocker that actuates the switching element using a rocker movement initiated by an actuation of the operating element, the rocker comprising a first rocker part and a second rocker part which are hinged together,
    wherein the rocker is coupled to the switching element by a rocker joint,
    wherein the operating apparatus further comprises a first pin connector that contacts the first rocker part and a second pin connector that contacts the second rocker part,
    wherein the first pin connector and the second pin connector extend between the operating element and the rocker, and
    wherein the switching element is switched by a folding motion of the first rocker part and the second rocker part.

2. The operating apparatus according to claim 1, wherein the first pin connector and the second pin connector extend on both sides of the circuit board through a feedthrough in the circuit board.

3. The operating apparatus according to claim 1, further comprising:
    at least one capacitive sensor that detects a point of contact by an operator on an operating surface of the operating element.

4. The operating apparatus according to claim 3, wherein the operating surface of the operating element is seamless.

5. The operating apparatus according to claim 1, wherein the operating element further comprises:
    at least one pictogram which describes a function of the at least one electrical appliance, the at least one pictogram being at least partly transparent, and
    a lighting element that is arranged on the second side of the circuit board to illuminate the at least one pictogram.

6. The operating apparatus according to claim 5,
    wherein a plurality of electrical appliances are operated by the operating apparatus,
    wherein the operating element displays the plurality of electrical appliances as a plurality of pictograms that are spatially separated from one another,
    wherein the operating apparatus further operates a respective electrical appliance based on a signal of a capacitive sensor, said signal being produced by a spatial actuation of one pictogram out of the plurality of pictograms by a finger of an operator, and
    wherein the plurality of pictograms are at least partly transparent and a respective lighting element is arranged to illuminate a respective pictogram on the second side of the circuit board and the respective lighting element differs in terms of its colour and illumination type.

7. The operating apparatus according to claim 1,
    wherein the switching element is a microswitch, a switching mat, or a snap-action panel for producing haptic feedback, and
    wherein the operating element is a pushbutton or a roller.

8. A motor vehicle component comprising the operating apparatus according to claim 1.

9. A vehicle comprising the motor vehicle component according to claim 8.

10. A method for operating an operating apparatus for at least one electrical appliance in a motor vehicle, the method comprising:
    actuating an operating element of the operating apparatus;
    actuating a switching element on a first side of a circuit board of the operating apparatus,
    wherein the circuit board is arranged between the operating element and the switching element such that the first side faces away from the operating element and a second side, lying opposite the first side, faces the operating element; actuating a rocker when the operating element is actuated; and
    switching the switching element by a rocker movement of the rocker,
    wherein the rocker has a first rocker part and a second rocker part which are hinged together,
    wherein the rocker is coupled to the switching element by a rocker joint,
    wherein the operating apparatus further comprises a first pin connector that contacts the first rocker part and a second pin connector that contacts the second rocker part,
    wherein the first pin connector and the second pin connector extend between the operating element and the rocker, and
    wherein the switching element is switched by a folding motion of the first rocker part and the second rocker part.

11. An operating apparatus for operating at least one electrical appliance in a motor vehicle, the operating apparatus comprising:
    an operating element;
    a circuit board comprising a first side and a second side, the first side comprising a switching element,
    wherein the switching element is switched when the operating element is actuated, and
    wherein the circuit board is arranged between the operating element and the switching element such that the first side faces away from the operating element and the second side, lying opposite the first side, faces the operating element;

a rocker that actuates the switching element using a rocker movement initiated by an actuation of the operating element, and at least one connector between the operating element and the rocker, the at least one connector being a pin connector which extends perpendicular to the rocker prior to the actuation of the operating element, wherein the rocker is a single integral plate, coupled to the at least one connector at a first end of the rocker, and coupled to the switching element at a second end of the rocker, and wherein the rocker actuates the switching element using the rocker movement initiated by the actuation of the operating element, and wherein the rocker pivots about a rocker bearing lying between the first end and the second end of the rocker such that the switching element is actuated based on a pivoting movement of the rocker at the second end of the rocker.

* * * * *